United States Patent [19]

Kiyono

[11] Patent Number: 5,610,209
[45] Date of Patent: Mar. 11, 1997

[54] HEAT-RESISTANT EPOXY RESIN COMPOSITION HAVING EXCELLENT STABILITY AT NORMAL TEMPERATURE AND CURING AGENT FOR EPOXY RESIN

[75] Inventor: Shigeo Kiyono, Tokyo, Japan

[73] Assignee: Japan Hydrazine Co., Ltd., Tokyo, Japan

[21] Appl. No.: 458,382

[22] Filed: Jun. 2, 1995

[30] Foreign Application Priority Data

Jun. 3, 1994 [JP] Japan .................................. 6-122124

[51] Int. Cl.$^6$ .................. C08G 59/44; C08G 59/50; C08G 65/00
[52] U.S. Cl. .................. 523/428; 523/445; 523/457; 523/458; 523/459; 523/466; 528/97; 528/119; 528/407; 525/484; 525/524; 525/526; 428/413; 564/149; 564/164
[58] Field of Search ......................... 528/119, 97, 407; 525/484, 524, 526; 523/428, 445, 457, 458, 459, 466; 428/413; 568/149, 164

[56] References Cited

U.S. PATENT DOCUMENTS

| | | | |
|---|---|---|---|
| 2,847,395 | 8/1958 | Wear | 528/119 |
| 3,755,258 | 8/1973 | Tiedman | 260/59 |
| 4,585,698 | 4/1986 | Anzai et al. | 428/413 |

FOREIGN PATENT DOCUMENTS

| | | | |
|---|---|---|---|
| 163128 | 7/1991 | Japan | 525/481 |

OTHER PUBLICATIONS

Chemical Abstracts 54:21003h, "Preparation of Halogen Derivatives of Esters of Perinaphthindandione carboxylic Acid".

*Primary Examiner*—Frederick Krass
*Attorney, Agent, or Firm*—Robbins, Berliner & Carson, LLP

[57] ABSTRACT

A newly-blended one part system heat-resistant epoxy resin composition which exhibits excellent stability at room temperature, quickly undergoes the curing reaction, molded within short periods of time, and, after cured, exhibits excellent Tg, resistance against the water, resistance against degradation by heat, and a variety of excellent properties in combination. The heat-resistant epoxy resin composition having excellent stability at room temperature comprises an epoxy compound having two or more epoxy groups, a curing agent which comprises a naphthalenedicarboxylic dihydrazide as a main component, and a ceramic whisker as a filler.

5 Claims, No Drawings

HEAT-RESISTANT EPOXY RESIN COMPOSITION HAVING EXCELLENT STABILITY AT NORMAL TEMPERATURE AND CURING AGENT FOR EPOXY RESIN

BACKGROUND OF THE INVENTION

1. Field of the Invention

The present invention relates to a heat-resistant epoxy resin composition having excellent stability at normal temperature. More specifically, the invention relates to an epoxy resin composition that has a long pot life and, after it is cured, exhibits large resistance against deformation by heat (or a high glass transition point) and excellent resistance against degradation by heat.

2. Prior Art

So far, aromatic diamines and, particularly, diaminodiphenyl sulfones (hereinafter referred to as DDS) have been widely used as curing agents for liquid bisphenol A diglycidyl epoxy resins (hereinafter referred to as DGEBA epoxy resins) requiring, however, the reaction at a high temperature and for an extended period of time for being cured. As a cure promoting agent, therefore, a boron trifluoride amine complex compound is usually added resulting, however, in a decrease in the resistance against the water and electric properties to a large extent. Moreover, addition of the cure promoting agent affects the pot life.

There have further been known an anhydride of a tetrabasic acid and, particularly, an anhydrous pyromellitic acid as heat-resistant curing agents to substitute for DDS. They, however, have high melting points involving inconvenience from the standpoint of operation and are, hence, used being blended with other acid anhydrides. The epoxy resin using such acid anhydrides has a heat resistance which is a glass transition temperature (Tg) of as high as 202° to 213° C. but remains being readily to be used for only as short as about 30 minutes at 80° to 90° C.

It has been known already to use a dicarboxylic acid dihydrazide as a curing agent for epoxy resins, and the applicants are placing adipic dihydrazide, sebacic dihydrazide, isophthalic dihydrazide and dodecandicarboxylic dihydrazide in the market.

However, the conventional curing agents for epoxy resins were not still satisfactory in regard to stability at room temperature when they were blended in the epoxy resin, and resistance against the heat and resistance against the water when the epoxy resins were cured.

It has therefore been desired to develop a newly blended one part system heat-resistant epoxy resin composition by using an epoxy compound having two or more epoxy groups, the epoxy resin composition exhibiting excellent stability at room temperature, having property to undergo curing reaction at an increased rate contributing to shortening the time for molding, and the epoxy resin composition after cured exhibiting high Tg, excellent resistance against the water, resistance against degradation by heat and excellent properties in combination.

According to the present invention, there is provided a heat-resistant epoxy resin composition having excellent stability at room temperature comprising an epoxy compound having two or more epoxy groups and a curing agent which comprises a naphthalenedicarboxylic dihydrazide as a main component and, particularly, a one part system heat-resistant epoxy resin composition.

It is desired that the epoxy resin composition contains ceramic whisker as a filler from the standpoint of resistance against the heat and mechanical properties.

According to the present invention, furthermore, there is provided a curing agent for epoxy resins comprising a naphthalenedicarboxylic dihydrazide and, particularly, a 2,6-naphthalenedicarboxylic dihydrazide.

According to the present invention, the naphthalenedicarboxylic dihydrazide is used as a curing agent for epoxy resins. As will be described later by way of Examples, when added to the epoxy resin, the naphthalene dicarboxylic dihydrazide exhibits a pot life which is usually longer than 21 days at 40° C. (which corresponds to 180 days at 25° C.) yet exhibits excellent curing reactivity when heated. Besides, the resin after cured exhibits Tg which is not lower than 200° C. and, often, reaching 260° C., and further exhibits excellent resistance against degradation by heat and resistance against the water.

The naphthalenedicarboxylic dihydrazide used in the present invention has a chemical structure expressed by the following formula (1),

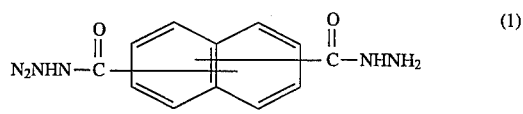

and has a distinguished feature in that it contains a functional goup of dicarboxylic acid dihydrazide and has a naphthalene skeleton. Owing to this feature, there is obtained a cured resin which has an excellent pot life and quickly curing property that stem from the dicarboxylic acid hydrazide, and further has a high glass transition temperature and excellent resistance against degradation by heat and resistance against the water.

The naphthalenedicarboxylic dihydrazide used in the present invention is particularly useful as a curing agent for the epoxy resin that has an aromatic group in the main chain thereof. Based upon the combination of the two, there is obtained a cured resin having a high Tg and excellent resistance against degradation by heat and resistance against the water.

It is desired that the naphthalenedicarboxylic dihydrazide is used in an amount of from 10 to 70 parts by weight and, particularly, from 20 to 60 parts by weight per 100 parts by weight of the epoxy resin. When its amount is smaller than the above-mentioned range, an extended period of time is needed for the curing or the cured resin loses resistance against the heat. When the amount is larger than the above-mentioned range, on the other hand, the machinability of the blended resin and the pot life are deteriorated or mechanical properties of the resin are deteriorated.

The naphthalenedicarboxylic dihydrazide used in the present invention has a feature in that it offers an excellent pot life yet exhibiting compatibility to the epoxy resin and further works to increase viscosity of the blended resin. It is therefore desired to use, as epoxy resins, an epoxy compound (A) which remains solid to semi-solid at room temperature and a liquid epoxy compound (B) having an epoxy equivalent of not larger than 200; i.e., it is desired to use the epoxy compound (A) which is solid to semi-solid (viscous liquid) at normal temperature and the liquid epoxy compound (B) of a low viscosity at a weight ratio of from 10:90 to 90:10 and, particularly, from 30:70 to 70:30.

Curing Agent

The naphthalenedicarboxylic dihydrazide which is used as a curing agent in the present invention is represented by the above-mentioned formula (1). Though the 2,6-naphthalenedicarboxylic dihydrazide (hereinafter often referred to as as NDH) is most desired, it is also allowable to use a 1,2-naphthalenedicarboxylic dihydrazide and a 1,8-naphthalenedicarboxylic dihydrazide.

The naphthalenedicarboxylic dihydrazide used in the present invention is obtained by the reaction of a dimethyl naphthalene dicarboxylate and a hydrazine hydrate. It is desired that the naphthalenedicarboxylic dihydrazide is used in a pure form. In particular, contamination of the hydrazine naphthalene dicarboxylate should be avoided from the standpoint of pot life, and its content should not be larger than 5% by weight and, particularly, not larger than 1% by weight. In this sense, it is desired that the above-mentioned reaction is carried out under the condition of an excess of hydrazine.

The naphthalenedicarboxylic dihydrazide is used alone to obtain satisfactory curing property. As desired, however, it may be used in combination with any other widely known curing agents or cure promoting agents within ranges in which excellent properties of the naphthalenedicarboxylic dihydrazide are not impaired.

Epoxy Resin Composition

The epoxy resin composition of the present invention contains an epoxy compound having two or more epoxy groups and a curing agent which includes the naphthalenedicarboxylic dihydrazide as a main component. It is desired that the naphthalenedicarboxylic dihydrazide is used in an amount of from 10 to 70 parts by weight and, particularly, from 20 to 60 parts by weight per 100 parts by weight of the epoxy resin.

The epoxy resin used in the present invention is a compound that contains two or more epoxy groups in one molecule. It is desired that the epoxy resin used in the present invention has an epoxy equivalent weight of from 100 to 1000 and, particularly, from 150 to 500. Examples of such an epoxy resin include the following:

I: Glycidyl ether epoxy resins of polyphenol compounds such as bisphenol A, 2,2-bis(4-hydroxyphenylbutane)(bisphenol B), 1,1'-bis(4-hydroxyphenyl) ethane, bis(4-hydroxyphenyl) methane (bisphenol F), 1,1,2,2-tetrakis(4-hydroxyphenyl) ethane, 4-hydroxyphenyl ether, p-(4-hydroxy) phenol, etc., i.e., diglycidyl ether bisphenol epoxy resins (hereinafter often called DGEBA);

II: Glycidyl ether epoxy resins of nucleus hydride of the above-mentioned polyphenol compounds;

III: Glycidyl ether epoxy resins of polyhydric phenols such as catechol, resorcinol, hydroquinone and phloroglucinol;

IV: Glycidyl ether epoxy resins of polyhydric alcohols such as ethylene glycol, butane diol, glycerol, erythritol and polyoxyalkylene glycol;

V: Novolak epoxy resin;

VI: Alicyclic epoxy resins such as vinylcyclohexene dioxide, limonene dioxide and dicyclopentadiene oxide;

VII: Polyglycidyl ester epoxy resins of ester condensates of phthalic acid and polycarboxylic acid such as cyclohexane-1,2-dicarboxylic acid.

VIII: Polyglycidylamine epoxy resin; and

IX: Methyl epichlorohydrin epoxy resin.

According to the present invention, it is desired that the epoxy compound that is used has an aromatic ring, rigid skeleton and resistance against the heat, and makes it possible to obtain a hard epoxy resin cured product. The epoxy compounds satisfying these requirements include, in addition to the DGEBA epoxy compound, the following epoxy compounds having aromatic rings: i.e., phenyl novolak polyglycidyl ether, o-cresol novolak polyglycidyl ether, bromophenol novolak polyglycidyl ether, tetraglycidyl m-xylene diamine, tetraglycidyldiaminodiphenyl methane, α-naphtholpolyglycidyl ether, naphthalenediol polyglycidyl ether, as well as EPPN-502 manufactured by NIPPON KAYAKU Co. and YDG414S manufactured by Toto Kasei Co.

These epoxy compounds generally remain in the form of a solid or a highly viscous liquid at room temperature, and are better used being dissolved in other low-viscous epoxy compounds having high dissolving power. In particular, NDH is used in a relatively large amount and, hence, tends to become viscous. To facilitate the working operation, therefore, it is desired to use a low-viscous epoxy compound in combination. As the low-viscosity epoxy compounds, there can be used bifunctional epoxy compounds such as a DGEBA epoxy compound having an epoxy equivalent weight of not larger than 200, a bisphenol F epoxy compound having an epoxy equivalent of about 180, and a diglycidyl aniline, as well as a monofunctional epoxy compound such as phenylglycidyl ether in combination with these bifunctional epoxy compounds.

It is desired to use an epoxy compound (A) which is solid or semi-solid at room temperature and a liquid epoxy compound (B) having an epoxy equivalent of not larger than 200 in combination, i.e., to use the epoxy compound (A) which is solid or semi-solid (viscous liquid) at room temperature and the low-viscous liquid epoxy compound (B) at a weight ratio of from 10:90 to 90:10 and, particularly, from 30:70 to 70:30.

The epoxy resin composition containing a heat-resistant epoxy compound and a naphthalenedicarboxylic dihydrazide exhibits a long pot life, a high rate of heat-curing reaction, good moldability, and makes it possible to obtain an excellent cured product.

The epoxy resin composition of the present invention may be further blended with a filler and a reinforcing agent that have been widely known.

For instance, the epoxy resin composition of the present invention may be blended with inorganic fillers such as silica, calcium carbonate, talc, alumina, aluminum hydroxide, magnesium hydroxide, iron oxide, magnesium oxide, magnesium silicate, aluminum silicate, mica, barium sulfate, carbon black, graphite and asbestos, or metal powders such as of aluminum, copper, silver, nickel, chromium and stainless steel, or ceramics fibers such as flakes, glass fibers, alumina and zirconia, as well as carbon fibers, aramid fibers and metal fibers.

In particular, the epoxy resin composition of the present invention blended with a ceramic whisker exhibits greatly improved resistance against degradation by heat. Examples of the ceramic whisker used in the present invention include silicon carbide (SIC), silicon nitride ($Si_3N_4$), aluminum nitride (AlN), potassium titanate ($K_2O.6TiO_2$), aluminum borate ($9Al_2.2B_2O_3$) and calcium sulfate ($CaSO_4$). The amount of addition may increase or decrease depending upon the viscosity of the resin composition but is suitably from 5 to 30 parts by weight per 100 parts by weight of the epoxy compound.

EXAMPLES

The invention will now be described by way of Examples to which only, however, the invention is in no way limited. In Examples, abbreviations of the components that are used, names of the compounds, and names of the manufactures are as follows:

A. Epoxy Compounds

1. Epicoat 828: bisphenol A glycidyl ether having an epoxy equivalent weight of about 190 (produced by Yuka Shell Epoxy Co.)

2. ESN-365: naphthalenediol polyglycidyl ether having an epoxy equivalent weight of 165 (produced by Nippon Steel Chemical Co.)

3. EPPN-502: aromatic monocyclic polyglycidyl ether having an epoxy equivalent weight of 166 (produced by NIPPON Kayaku Co.)

4. EOCN-102: o-cresol novolak polyglycidyl ether having an epoxy equivalent weight of about 225 (produced by NIPPON Kayaku Co.)

5. TETRAD-X: tetraglycidyl m-xylene diamine having an epoxy equivalent weight of about 100 (produced by Mitsubishi Gas Chemical Co.)

6. MY 720: tetraglycidyldiaminodiphenylmethane having an epoxy equivalent weight of about 120 (produced by Chiba Geigy Co.)

7. GAN: diglycidyl aniline having an epoxy equivalent weight of about 125 (produced by NIPPON Kayaku Co.)

8 PGE: phenylglycidyl ether having an epoxy equivalent weight of 150 (sold by Nishiki Trading Co.)

B. Curing Agents

1. NDH: 2,6-naphthalenedicarboxylic dihydrazide (produced by Japan Hydrazine COMPANY)

2. ADH: adipic dihydride (produced by Japan Hydrazine COMPANY)

3. IDH: isophthalic dihydrazide (produced by Japan Hydrazine COMPANY)

4. DDS: diaminodiphenyl sulfone (sold by Nishiki Trading Co.)

5. PMDA: anhydrous pyromellitic acid (produced by DAICEL CHEMICAL INDUSTRIES, LTD)

C. Cure Promoting Agent

1. BF$_3$MEA: boron fluoride monoethylamine (produced by Hashimoto Chemical Corporation)

D. Ceramic whisker.

1. SiC: silicon carbide whisker (produced by Tateho Chemical Industries)

2. TISMO-N101: potassium titanate ($K_2O \cdot 6TiO_2$) (produced by Otsuka Chemicals Co.)

3. Alborex SY-3: aluminum borate ($9Al_2O_3 \cdot 2B_2O_3$) (produced by Shikoku Kasei Chemicals Co.)

The epoxy resin composition was evaluated in a manner as described below.

1. Pot life:

The sample was placed in a constant-temperature bath maintained at a predetermined temperature (40° C.) and the number of days was counted until it exhibited no fluidity at 40° C. In general, 40° C.•5 days corresponds to 25° C.•12 to 13 days, 40° C.•21 days corresponds to 25° C.•about 180 days, and 40° C.•25 days corresponds to 25° C.•about 200 days. The epoxy resin composition containing NDH has a high viscosity and, hence, the mixing operation must be carried out at 40° to 50° C.

2. Glass transition temperature (Tg•°C.):

As an indication of resistance against deformation by heat, a sample cured at a predetermined temperature for a predetermined period of time was measured for its Tg by using a thermo-mechanical analyzer (TMA).

Rate of temperature rise: 10° C./min.

Load: 10 g

Diameter of needle: 1 mm

3. Evaluation of resistance against degradation by heat.

A sample was introduced into a high-temperature vessel heated at a predetermined temperature to observe cracks and carbonization. The time was measured until cracks and carbonization took place.

4. Evaluation of water-absorbing rate %:

A sample measuring 25×25×3 mm was prepared under the curing conditions of a predetermined temperature and time, and was immersed in the boiling water for 24 hours to find the water-absorbing rate %.

EXAMPLE 1

To a mixture of Epicoat 828 and GAN as a base resin, were added NDH, DDS, BF$_3$-MEA and PMDA to obtain compositions, which were then measured for their pot lives at 40° C., Tg, water-absorbing rate % and resistance against degradation by heat. Composition ratios of the compositions and properties measured were as shown in Table 1 (blended in parts by weight). In Table 1, composition 1 and composition 4 lie within the scope of the present invention, and other compositions are for comparison.

TABLE 1

|  | Composition 1 | Composition 2 | Composition 3 | Composition 4 | Composition 5 | Composition 6 |
|---|---|---|---|---|---|---|
| Epicoat 828 | 80 | 80 | 80 | 80 | 80 | 80 |
| GAN | 20 | 20 | 20 | 20 | 20 | 20 |
| NDH | 30 |  |  | 30 |  |  |
| DDS |  | 33 |  |  | 33 |  |
| BF$_3$-MEA |  | 1 |  |  | 1 |  |
| FMDA |  |  | 53 |  |  | 53 |
| p-life at 40° C. days | >25 | 4–5 | 90° C., 30 min | >25 | 4–5 | 90° C., 30 min |
| Cured (min.) |  |  |  |  |  |  |
| 120° C. | 60 | 120 |  | 60 | 120 |  |
| +180° C. | 120 | 180 | 60 | 120 | 180 | 60 |
| Tg °C. | 206 | 178 | 213 | 206 | 178 | 213 |
| water-absorbing rate % | 1.1 | 3.2 | 1.3 |  |  |  |

TABLE 1-continued

|  | Composition 1 | Composition 2 | Composition 3 | Composition 4 | Composition 5 | Composition 6 |
|---|---|---|---|---|---|---|
| Alborex YS-3 |  |  |  | 14 | 14 | 14 |
| gradation heat 220° C. (min) | 10 cracked | 1.5 cracked | 30 cracked |  |  |  |
| gradation heat 250° C. (min) |  |  |  | 30 OK | 15 cracked | 30 OK |

The composition 3 and the composition 6 blended with PMDA exhibited good water-absorbing rates and Tg. To be blended in the epoxy resin, however, the PDMA was partly picked up and was blended by being dissolved at about 90° C. Therefore, the compositions exhibited pot lives of as short as about 30 minutes. On the other hand, the composition 2 and the composition 5 blended with DDS, after they were cured, exhibited high water-absorbing rates and low Tg and required extended periods of time for curing. Besides, the compositions exhibited pot lives of as short as about 4 to 5 days. The compositions 1 and 4 blended with NDH, on the other hand, exhibited pot lives of not shorter than 21 days, were cured within short periods of time and, after cured, exhibited small water-absorbing rates, high Tg and excellent resistance against degradation by heat.

EXAMPLE 2

An o-cresol novolak polyglycidyl ether (EOCN-1025) is an epoxy compound which remains solid at room temperature. Therefore, it was dissolved at about 90° C. in a mixture liquid resin of Epicoat 828, GAN and PGE, and the mixture was then cooled at 40° C., and to which were added predetermined amounts of a curing agent and a ceramic whisker. The composition ratios of components used in this Example and the obtained properties were as shown in Table 2, wherein the compositions 1 and 3 lie within the scope of the present invention and other compositions are for comparison.

EXAMPLE 3

The composition of a tetraglycidylamino resin (TETRAD-X) and DDS has now been extensively used as a carbon fiber composite material accompanied, however, by defects in regard to perfect curing and resistance against the water that are due to the DDS. By using the NDH, however, it can be expected to totally improve such defects. The blended compositions and the results were as shown in Table 3, wherein the compositions 1, 3, 5 and 6 lie within the scope of the present invention and other compositions are for comparison.

TABLE 2

|  | Composition 1 | Composition 2 | Composition 3 | Composition 4 |
|---|---|---|---|---|
| Epicoat 828 | 30 | 30 | 30 | 30 |
| GAN | 10 | 10 | 10 | 10 |
| PGE | 10 | 10 | 10 | 10 |
| EOCN-1025 | 50 | 50 | 50 | 50 |
| NDH | 28 |  | 28 |  |
| DDS |  | 32 |  | 32 |
| BF$_3$-MEA |  | 1 |  | 1 |
| ALBOREX G |  |  | 14 | 14 |
| p-life at 40° C. days | >21 | 3–4 | >21 | 3–4 |
| Cured (min.) |  |  |  |  |
| 120° C. | 60 | 60 | 60 | 60 |
| +180° C. | 120 | 120 | 120 | 120 |
| +200° C. | 120 | 120 | 120 | 120 |
| Tg °C. | 224 | 203 | 235 | 220 |
| gradation heat 260° C. (min) | 20 cracked | 15 cracked | 60 OK | 40 OK |
| water-absorbing rate % | 0.9 | 2.8 |  |  |

The compositions 2 and 4 blended with DDS exhibited pot lives of as short as 3 to 4 days, whereas the compositions 1 and 3 blended with NDH exhibited pot lives of not shorter than 21 days as well as excellent Tg and resistance against degradation by heat. As the compositions 3 and 4 prove, addition of the whisker is effective in improving not only resistance against degradation by heat but also glass transition temperatures.

TABLE 3

|  | Composition 1 | Composition 2 | Composition 3 | Composition 4 | Composition 5 | Composition 6 |
|---|---|---|---|---|---|---|
| MY-720 |  |  | 85 | 85 |  | 85 |
| TETRAD-X | 85 | 85 |  |  | 85 |  |
| GAN | 15 | 15 | 15 | 15 | 15 | 15 |
| NDH | 62 |  | 60 |  | 62 | 60 |
| DDS |  | 62 |  | 60 |  |  |
| $BF_3$-MEA |  | 1 |  | 1 |  |  |
| p-life at 40° C. days | >21 | 4–5 | >21 | 4–5 | >21 | >21 |
| Cured (min.) |  |  |  |  |  |  |
| 120° C. | 120 | 120 | 120 | 120 | 120 | 120 |
| +150° C. | 120 | 120 | 120 | 120 | 120 | 120 |
| +180° C. | 120 | 120 | 120 | 120 | 120 | 120 |
| Tg °C. | 235 | 186 | 264 | 242 | 235 | 264 |
| water-absorbing rate % |  |  | 0.4 | 4.9 |  |  |
| TISMO-N101 |  |  |  |  | 15 | 15 |
| gradation heat 280° C. (min) | 15 cracked | 1 cracked | 30 cracked | 20 cracked | 60 OK | 60 OK |

When the composition 3 blended with NDH is compared with the composition 4 blended with DDS, there is a large difference in the water-absorbing rate and differences in the pot lives, Tg and resistance against degradation by heat. These differences appear to a large extent particularly in the tetraglycidylamino resins.

EXAMPLE 4

The EPPN-502 and ESN-365 have the following structural formulas (2) and (3), and were developed as new heat-resistant epoxy resins. They remain solid at normal temperature. These two epoxy resins were dissolved in a mixture liquid resin of Epicoat 828 and GAN at about 80° C., cooled at 40° C., and were blended with predetermined amounts of NDH and a ceramic whisker. Composition ratios of the compositions and the measured values were as shown in Table 4.

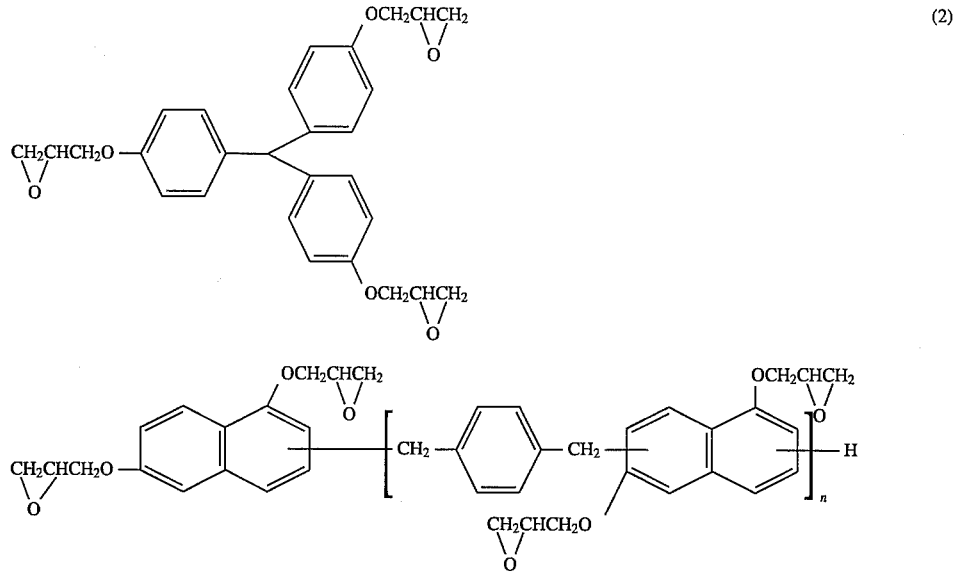

TABLE 4

|  | Composition 1 | Composition 2 | Composition 3 | Composition 4 | Composition 5 |
|---|---|---|---|---|---|
| Epikoat 828 | 30 | 30 | 30 | 30 | 30 |
| GAN | 20 | 20 | 20 | 20 | 20 |
| EPPN-502 | 50 | — | 50 | — | 50 |
| ESN-365 |  | 50 |  | 50 |  |
| NDH | 36 | 36 | 36 | 36 | 36 |
| Alborex YS-3 |  |  | 14 |  |  |

TABLE 4-continued

|  | Composition 1 | Composition 2 | Composition 3 | Composition 4 | Composition 5 |
|---|---|---|---|---|---|
| TISMO-N101 |  |  |  | 14 |  |
| SIC |  |  |  |  | 14 |
| p-life at 40° C. days |  |  |  |  |  |
| Cured (min.) |  |  |  |  |  |
| 120° C. | 60 | 60 | 60 | 60 | 60 |
| +160° C. | 120 | 120 | 120 | 120 | 120 |
| +200° C. | 60 | 60 | 60 | 60 | 60 |
| Tg °C. | 238 | 246 | 247 | 257 | 245 |
| water-absorbing rate % | 0.6 | 0.6 |  |  |  |
| gradation heat 280° C. (min) | 13 cracked | 10 cracked | 60 OK | 60 OK | 60 OK |

The inventors have worried about that the EPPN-502 and ESN-365 may exhibit strong reactivity since distances are short among their epoxy groups, and may hence possess short pot lives. In fact, however, they remained stable for not shorter than 180 days at room temperature.

EXAMPLE 5

The ADH and IDH are representative dihydrazides of dibasic acid having the following structural formulas and have now been widely used as curing agents for epoxy resins. The dihydrazides of dibasic acid were picked up by predetermined amounts and were mixed to the Epicoat 828 heated at 35° to 40° C. Composition ratios of the compositions and the measured values were as shown in Table 5 (blended in parts by weight).

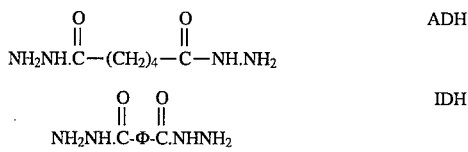

TABLE 5

|  | Composition 1 | Composition 2 | Composition 3 |
|---|---|---|---|
| Epicoat 828 | 100 | 100 | 100 |
| ADH | 23 |  |  |
| IDH |  | 25.5 |  |
| NDH |  |  | 29 |
| p-life at 40° C., days | >25 | >25 | >25 |
| Cured (min) |  |  |  |
| 120° C. | 60 | 60 | 60 |
| +170° C. | 180 | 180 | 180 |
| Tg. °C. | 137 | 162 | 210 |
| water-absorbing rate % | 3.2 | 2.1 | 0.9 |

According to the present invention which uses the naphthalenedicarboxylic dihydrazide as a curing agent, it is allowed to provide a newly-blended one part system heat-resistant epoxy resin composition which exhibits excellent stability at room temperature, quickly undergoes the curing reaction, molded within short periods of time, and, after cured, exhibits excellent Tg, resistance against the water, resistance against degradation by heat, and a variety of excellent properties in combination.

I claim:

1. A heat-resistant epoxy resin composition having excellent stability at room temperature comprising an epoxy compound having two or more epoxy groups, and a curing agent which includes 2,6-naphthalenedicarboxylic dihydrazide as a main component, wherein the 2,6-naphthalenedicarboxylic dihydrazide is contained in an amount of from 10 to 70 parts by weight per 100 parts by weight of the epoxy compound, and the epoxy compound comprises a combination of an epoxy compound (A) which remains solid or semi-solid at room temperature and a liquid epoxy compound (B) having an epoxy equivalent not larger than 200.

2. A heat-resistant epoxy resin composition according to claim 1, wherein the epoxy compound (A) and the epoxy compound (B) are contained at a weight ratio of from 10:90 to 90:10.

3. A heat-resistant epoxy resin composition having excellent stability at room temperature comprising an epoxy compound having two or more epoxy groups, and a curing agent which includes a 2,6-naphthalenedicarboxylic dihydrazide as a main component, wherein the 2,6-naphthalenedicarboxylic dihydrazide is contained in an amount of from 10 to 70 parts by weight per 100 parts by weight of the epoxy compound, and the epoxy resin composition is a one part system, and the epoxy compound comprises a combination of an epoxy compound (A) which remains solid or semi-solid at room temperature and a liquid epoxy compound (B) having an epoxy equivalent not larger than 200.

4. A heat-resistant epoxy resin composition having excellent stability at room temperature comprising an epoxy compound having two or more epoxy groups, a curing agent which includes a 2,6-naphthalenedicarboxylic dihydrazide as a main component, and a ceramic whisker as a filler, wherein the 2,6-naphthalenedicarboxylic dihydrazide is contained in an amount of from 10 to 70 parts by weight per 100 parts by weight of the epoxy compound, and the epoxy resin composition is a one part system, and the epoxy compound comprises a combination of an epoxy compound (A) which remains solid or semi-solid at room temperature and a liquid epoxy compound (B) having an epoxy equivalent not larger than 200.

5. The heat-resistant epoxy resin composition of claim 1, wherein the epoxy resin composition is a one part system.

* * * * *